(12) United States Patent
Draganoff

(10) Patent No.: US 6,301,376 B1
(45) Date of Patent: *Oct. 9, 2001

(54) SEGMENTED SLIDING YARDSTICKS ERROR TOLERANT FINGERPRINT ENROLLMENT AND VERIFICATION SYSTEM AND METHOD

(76) Inventor: Georgi H. Draganoff, 3235 Shoreline Drive, Oakville, Ontario (CA), L6L 5Z1

( * ) Notice: Subject to any disclaimer, the term of this patent is extended or adjusted under 35 U.S.C. 154(b) by 0 days.

This patent is subject to a terminal disclaimer.

(21) Appl. No.: 09/061,406

(22) Filed: Apr. 16, 1998

Related U.S. Application Data

(63) Continuation-in-part of application No. 08/852,382, filed on May 7, 1997.

(51) Int. Cl.⁷ .................................................. G06K 9/62
(52) U.S. Cl. ................................. 382/124; 382/209
(58) Field of Search .................. 382/115, 124, 382/125, 126, 127, 209, 218, 275, 283

(56) References Cited

U.S. PATENT DOCUMENTS

| | | | |
|---|---|---|---|
| 2,615,992 | 10/1952 | Flory et al. ................. | 179/100.3 |
| 2,616,983 | 11/1952 | Zworykin et al. ............ | 179/100.3 |
| 2,646,465 | 7/1953 | Davis et al. ................. | 179/16 |
| 2,663,758 | 12/1953 | Shepard ...................... | 178/17 |
| 2,679,636 | 5/1954 | Hillyer ....................... | 340/149 |
| 2,731,621 | 1/1956 | Sontheimer ................. | 340/149 |
| 3,713,100 | 1/1973 | Hemstreet ................... | 382/222 |
| 3,921,136 | * 11/1975 | Bar-Lev ...................... | 382/295 |
| 4,581,760 | 4/1986 | Schiller et al. .............. | 382/283 |
| 4,696,046 | 9/1987 | Schiller ...................... | 382/275 |
| 4,742,551 | 5/1988 | Deering ...................... | 382/170 |
| 4,752,966 | 6/1988 | Schiller ...................... | 382/125 |
| 4,896,363 | 1/1990 | Taylor et al. ................ | 382/201 |
| 4,933,976 | 6/1990 | Fishbine et al. ............. | 382/4 |
| 4,944,021 | * 7/1990 | Hoshino et al. ............. | 382/5 |

(List continued on next page.)

FOREIGN PATENT DOCUMENTS

| | | |
|---|---|---|
| 0 125 532 A2 | 11/1984 | (EP) . |
| 0 251 504 A2 | 1/1988 | (EP) . |
| 97/38392 | 10/1997 | (WO) . |

OTHER PUBLICATIONS

"A single chip sensor and image processor for fingerprint verification", Proceedings IEEE Custom Integrated Circuits Conference, 1991, by Anderson, S. et al.*

"Moving–window algorithm for fast fingerprint verification", IEEE Southeastcon '90 by Yahagi, H. et al.*

*Primary Examiner*—Amelia M. Au
*Assistant Examiner*—Martin Miller

(57) ABSTRACT

A fast position tolerant and economical fingerprint verification algorithm and software implementation is disclosed. The algorithm has very important advantages in comparison to existing fingerprint verification algorithms like minutia extraction or full image analysis based on a series of two dimensional fast Fourier transforms ( FFT's) and two dimensional cross correlation in speed, compactness of the template and finger positioning for verification. It is based on a small "yardstick" pattern being moved inside the image to be verified, and when a match is found the rest of the verification process is started. The yardstick is divided into segments in order to fit different DSP and microcontroller register lengths and structures. The software code implements the algorithm in the most efficient way for utilization on a digital signal processor architecture. A main area of application is in fingerprint identification and verification, but it could be implemented with same success in other image verification systems like iris, eye, face etc., where two images should be compared. The algorithm is adaptive, so various false acceptance and false rejection coefficients could be utilized very easily. It also produces a very compact template, which leads to better memory utilization in fingerprint databases.

54 Claims, 9 Drawing Sheets

U.S. PATENT DOCUMENTS

| | | | |
|---|---|---|---|
| 5,023,921 | * | 6/1991 | Goutte et al. .................... 382/58 |
| 5,067,162 | | 11/1991 | Driscoll, Jr. et al. ............ 382/126 |
| 5,146,548 | | 9/1992 | Bijnagte ......................... 395/117 |
| 5,204,761 | | 4/1993 | Gusmano ........................ 358/461 |
| 5,291,560 | * | 3/1994 | Daugman ........................ 382/2 |
| 5,420,937 | | 5/1995 | Davis ............................. 382/125 |
| 5,467,403 | | 11/1995 | Fishbine et al. ................. 382/116 |
| 5,717,469 | | 2/1998 | Jennes et al. .................... 348/571 |
| 5,768,441 | | 6/1998 | Yoshizawa et al. .............. 382/270 |
| 6,075,876 | * | 6/2000 | Draganoff ........................ 382/124 |

* cited by examiner

SEGMENTED SLIDING YARDSTICKS ERROR TOLERANT FINGERPRINT ENROLLMENT AND VERIFICATION SYSTEM AND METHOD

CROSS REFERENCE TO RELATED APPLICATION

This application is a continuation-in-part of application Ser. No: 08/852,382 filed May 7, 1997.

BACKGROUND OF THE INVENTION

The most popular method used by fingerprint verification device vendors is the minutia based verification. This is also the oldest method used by the FBI and other government agencies and in other countries around the world. It is well established understood and standardized. There is an ANSI (American National Standards Institute) standard for "Data Format for the Interchange of Fingerprint Information", describing a common format for interchange of minutia based fingerprint data. Minutia data represents four categories of fingerprint characteristic points: ridge ending, bifurcation, compound (trifurcation or crossover) and type undetermined. A ridge ending occurs when a friction ridge begins or ends within the fingerprint and without splitting into two or more continuing and the ridge must be longer than it is wide. A bifurcation occurs when a ridge divides or splits to form two ridges that continue past the point of division for a distance that is at least equal to the spacing between adjacent ridges at the point of bifurcation. A compound type occurs either when there is trifurcation, which is when a single ridge splits into three ridges, or there is a crossover, i.e. when two ridges intersect each other. Finally, when the minutia cannot be clearly categorized as one of the above three types, it is designated as undetermined. Minutia based systems, however, are pretty slow, and any defects in the input fingerprint image could generate false minutia. They are used predominantly in large fingerprint identification databases where input fingerprint data could be manually quality controlled and because minutia fingerprint data could be transferred between systems due to format standardization. They are also pretty expensive, which further limits their areas of application.

There are other systems, based on full image analysis. They perform complex two dimensional FFT's on the fingerprint data. Then in the frequency domain a two dimensional cross correlation is done between 2D-FFT of the fingerprint to be verified and the conjugate of the template image (or vice versa) and the cross correlation result is thresholded to determine if the images are similar. In some devices cross correlation is performed optically.

Those systems are usually much faster than the minutia based ones. However, the size of their templates is usually much larger and they are not very suitable for large fingerprint data bases due to the nature of the verification process.

Both described systems are also very sensitive to the finger placement on the fingerprint image scanner devices. Relatively small displacements or rotations of the finger could lead to false results.

The present invention is directed to a system and algorithm to avoid shortcomings of the existing fingerprint enrollment and verification systems and algorithms.

According to various aspects of the present invention, digitized fingerprint image data is obtained. From it, sets of data called "yardsticks" are extracted. The yardsticks are preferably linear sections from the enrollment fingerprint representation. Preferably, each yardstick comprises data for a set of co-linear pixels which extend in a predetermined direction, e.g. row-wise or column-wise. In a basic enrollment, the yardsticks do not seek to find features or subfeatures, but simply represent the data for the fingerprint to be enrolled. Preferably, these yardsticks are divided into segments, which are subsets of the yardstick data. Preferably, each segment represents data for a group of adjacent pixels in the yardstick, and there preferably will be a first segment, then a second segment, and so forth, depending on how many segments are desired per yardstick. Preferably, the yardsticks and segments thereof are stored in a predetermined order in a data structure, which may be called a template. In one variation, each yardstick may be composed of parts of two adjacent rows (when yardsticks are aligned row-wise).

For fingerprint verification, the disclosed apparatus and method seek a statistical similarity between an enrolled fingerprint and the fingerprint to be verified. It first seeks to match a first yardstick to a corresponding amount of data representing the fingerprint image to be verified. Yardstick data or segment data is moved throughout the image, preferably in a predetermined order, and comparisons are made to find a sufficient match. This match is a statistical match which may be calculated using, for example, the Hamming distance.

With reference to embodiments using the segmented yardsticks, preferably a provision is made so that a yardstick may be found to match even if not every segment is matched. That is, if enough other segments of that yardstick sufficiently match the data, the method and apparatus are allowed to conclude that a match has been found for the yardstick.

Once the first yardstick has been matched, the location of the match is known, and because the location of the other yardsticks to be tested is known relative to the position of the first yardstick, the method and apparatus checks other yardsticks in only limited numbers of locations.

Preferably the apparatus and method employ an optimization routine during some of the matching tests. In such a procedure, if a match is found, the threshold for declaring a match is lowered, and testing repeats with repeated lowerings of the threshold until the relevant segment is found not to match. This indicates that the immediately prior test was the best match, and the procedure continues.

Provision is made in the preferred method and apparatus according to other features to permit verification despite entire yardsticks not matching the image. After matching a first yardstick, or illustratively the first two yardsticks, subsequent yardsticks are permitted not to match, and for each non-matching yardstick, a mismatch counter or count is incremented. The yardsticks may be grouped by position or otherwise so that if, illustratively, the non-matching yardstick is located below the first yardstick, then a first mismatch count is incremented, but if a non-matching yardstick is located above the first matching yardstick, then a second mismatch count is incremented. Various decision rules are permitted with this arrangement where, for example, rejection ratios and tolerances are to be controlled. Illustratively, if the number of failed yardsticks passes a preselected threshold number, that threshold number may be increased. It alternatively may be ignored, with the possibility of maintaining or tightening the tolerance for the other mismatch count. Of course, the decision algorithm may require all yardsticks that are presented for match to find a match. Not all yardsticks need to be presented, however, and in one version described herein, only six yardsticks are employed, and even that embodiment may use a mismatch count to permit some yardsticks to remain unmatched.

SUMMARY OF THE INVENTION

The size of the template produced during enrollment is very compact, smaller than that of full image analysis systems, and comparable to that of minutia based systems. Due to the hierarchical way of organization this algorithm is much faster than existing ones and also allows easy implementation in both, verification and identification systems—one to one, and one to many.

The template is comprised of a number of line patterns called for convenience "yardsticks". Those yardsticks represent parts of video lines from the acquired during enrollment process fingerprint image and are organized in a special order inside the template.

The consequential "sliding yardstick" comparison process with the fingerprint image acquired for verification, during verification part of the algorithm allows for very wide tolerances in regard to positioning and skew of the finger to be verified on the finger image input scanner device.

The code implementing the algorithm is very efficient and allows the use of low cost digital signal processor (DSP) engines. Memory requirements are very reduced.

This approach permits adjustments to be made for lower or higher false rejection or acceptance coefficients and the size of the template will change proportionally too. So, devices for various applications and market segments could be easily implemented.

BRIEF DESCRIPTION OF THE DRAWINGS

In describing the preferred embodiments, reference is made to accompanying drawings wherein:

FIG. 3a shows the start of the initial search, when the starting yardstick is sliding along the rows of the image to be verified. FIG. 3b shows the case when the starting yardstick has found a match and the second yardstick is compared to a limited number of possible positions (three in this case). FIG. 3c shows the verification matching process in a very advanced stage, when the n-th yardstick, adjacent to the starting yardstick, has been tested for a match at a single position.

DETAILED DESCRIPTION OF PREFERRED EMBODIMENT

Figure 7:
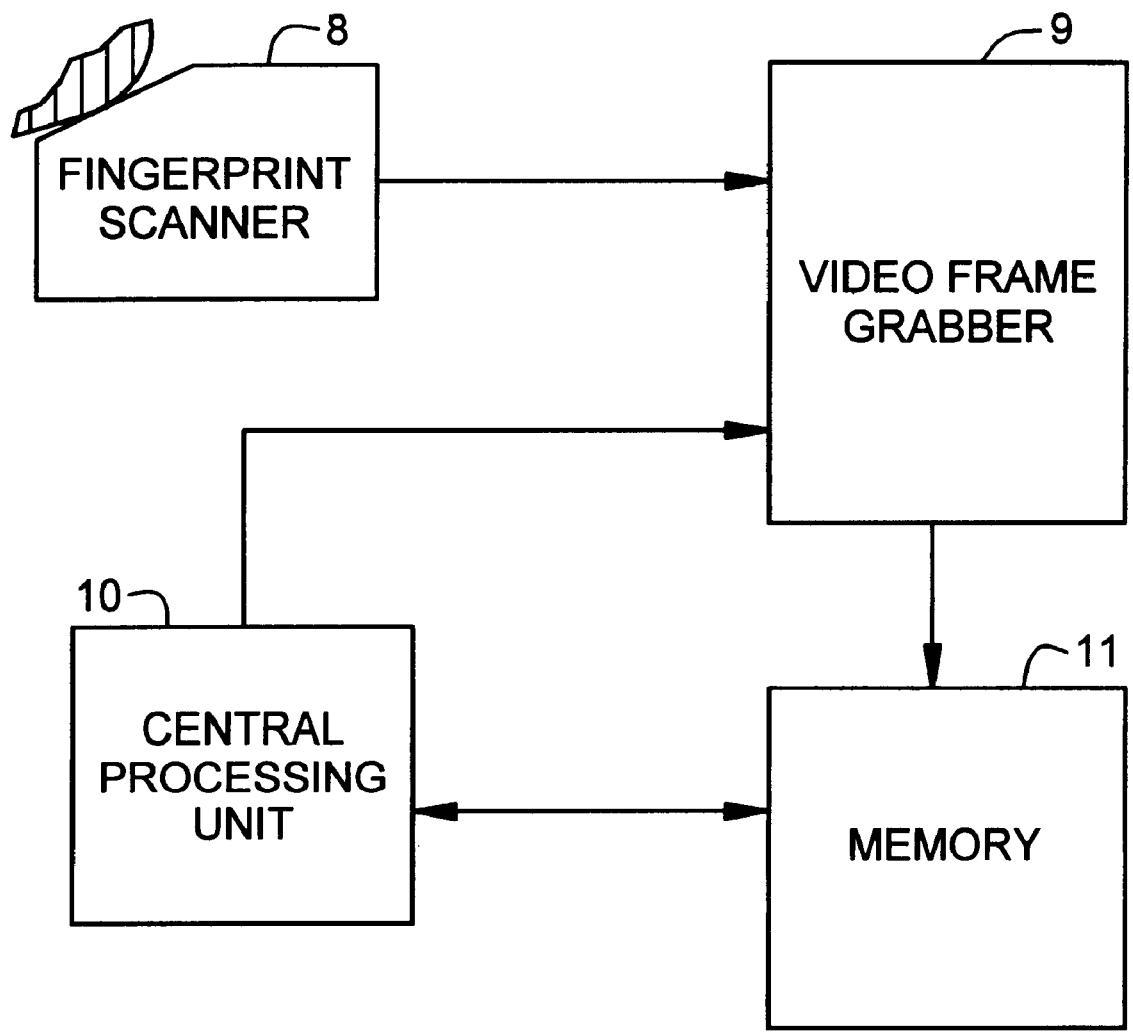
FIG. 7 shows a general block diagram of a fingerprint enrollment and verification system according to the preferred embodiment.

A general block diagram of a fingerprint enrollment and verification system is shown in FIG. 7. A fingerprint image scanner 8 translates the applied finger fingerprint image into a standard video signal. That video signal is applied to a video frame grabber 9. The video frame grabber 9 acquires video flames acquires, extracts fingerprint images of necessary pixel number size as required by the two parts of the fingerprint enrollment and verification algorithm, and saves them into memory 11, under the control of a central processing unit 10. It is preferable if the frame grabber 9 had the ability to extract the exact pixel number size images before they are saved in memory 11, but it is not a problem if it saves images of standard size in memory 11, and the images necessary for the purposes of enrollment and verification are extracted later with the necessary size from those saved into memory 11.

Figure 1:
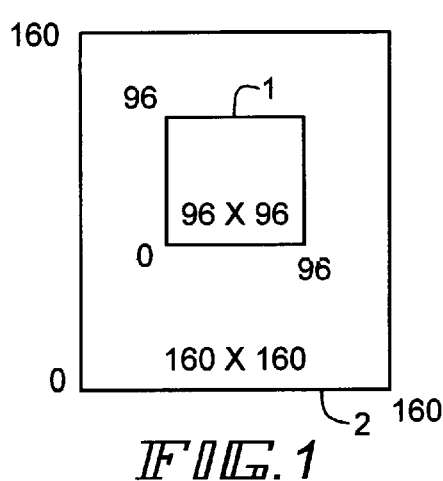
FIG. 1 shows an example and comparison of enrollment fingerprint image window placed inside the window used for verification during fingerprint verification algorithm.

FIG. 1 shows windows 1 and 2 which represent the sizes in pixels of the two images. The image that fits in window 1 is used for enrollment, and it has a selected size for the preferred embodiment of 96×96 pixels. The other image to be verified within window 2 during the verification process has a size of 160×160 pixels. The enrollment image will be called enrollment window 1 for brevity and as shown, it is extracted from the middle of the acquired image inside the verification window 2.

The enrollment window 1, which as already said is extracted from the middle of the enrolled fingerprint image and has a size of 96×96 pixels, is used to compose an enrollment template. It of course could be processed further to make the template more compact, but first this processing should be preferably lossless and reversible, and is not important for description of the "yardstick" algorithm. This enrollment window 1 is further organized in patterns called for convenience yardsticks. Each yardstick represents a linear pattern exactly half a line from the enrollment window 1 in this illustrative embodiment, which means for the above window of 96×96 pixels, each yardstick will have a length of 48 pixels.

If the image is of a line art type, then each pixel will be represented by a single bit. Those yardsticks are assigned sequential numbers defining in what sequence will they be used during comparison process with the image to be verified.

Before addressing too many details the following overview may be useful. This first embodiment enrolls a fingerprint image and, as will be described, subsequently compares another fingerprint image for verification. The enrollment process extracts yardsticks which may comprise half-lines, whole lines, or columns. The yardsticks are preferably of uniform size, and each yardstick contains black-white data (in the preferred embodiment) for the image to be enrolled. Preferably the enrollment stores data as a template in a suitable format. At a later time, when comparing an image to be verified, in a simple case (for line art), the first yardstick is compared with the acquired image (which preferably is larger than the enrollment window). It will be understood that electronic signals or data for "images" are compared, rather than optical images themselves, in the preferred embodiment. In the preferred algorithm, the first (stored) yardstick is sought to be matched with a given line of the acquired image, and is compared on a bit-by-bit basis. Absent finding a match, the yardstick is shifted along the line, or, if necessary, will shift to another line, and seek a match along that row. Assuming a match results for the first yardstick, the second yardstick is next compared to the image to be verified, and can be shifted left or right a limited amount, or not at all, depending on skew. The best match is chosen, and the process continues for all yardsticks, of a first group, e.g. a column, can be matched. Then remaining yardsticks can be matched. If the best match is below a tolerance, verification is positive. Several modifications will be described for the yardstick handling and for determining match criteria. This technique will apply also to grey scale data.

Figure 2:
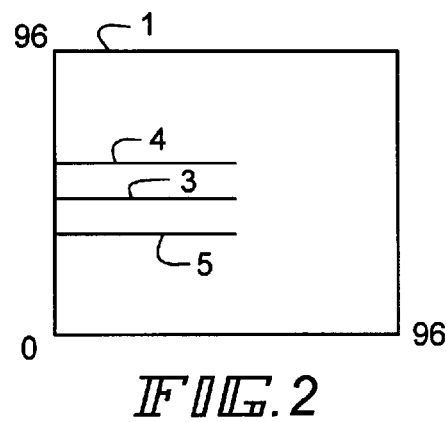
FIG. 2 shows only the enrollment fingerprint image window, which in this case has been selected to be of 96×96 pixels size, and also first three linear patterns (yardsticks), each of which in this case comprises one-half of an enrollment image row. In other cases those yardsticks could be linear patterns, parts of the columns of the enrollment window.

FIG. 2 shows how yardsticks are numbered for this particular description of the sliding yardstick algorithm. The first yardstick 3 comprises the left half of line 31. The second yardstick 4 contains the left half of line 33. The third yardstick 5 occupies the left half of line 29, etc. The sixty-fourth yardstick is the right half of line 31 and so on. Thus, it will be seen that each yardstick preferably has the same length. Note that depending on particular requirements any other sequence is possible and acceptable. It is also possible for other applications yardsticks to be vertical line patterns comprising parts of enrollment window 1. The yardsticks could be also whole lines or whole columns.

Figure 6:
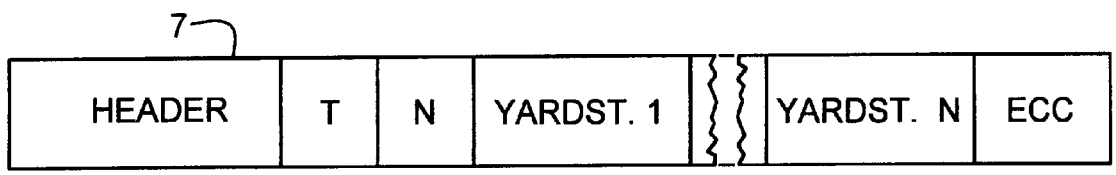
FIG. 6 is an illustration of an enrollment template data structure usable with the preferred embodiment.

FIG. 6 shows an example of the template 7 produced during fingerprint enrollment process to be used later for verification purposes. The template 7 has a header, which could contain various types of useful data, like the enrolled person's ID, classification data, etc. Its structure has not been described, because it has no relation to described algorithm. The header is followed by the type data field denoted with letter T on FIG. 6. The type data field T defines the type of algorithmic sequence used during verification and its purpose is to ensure future compatibility. Next field N contains the exact number and length of yardsticks following it, and the yardstick data from yardstick 1 to yardstick N follows. At the end of the template, there is an error control code field ECC.

Figure 8:
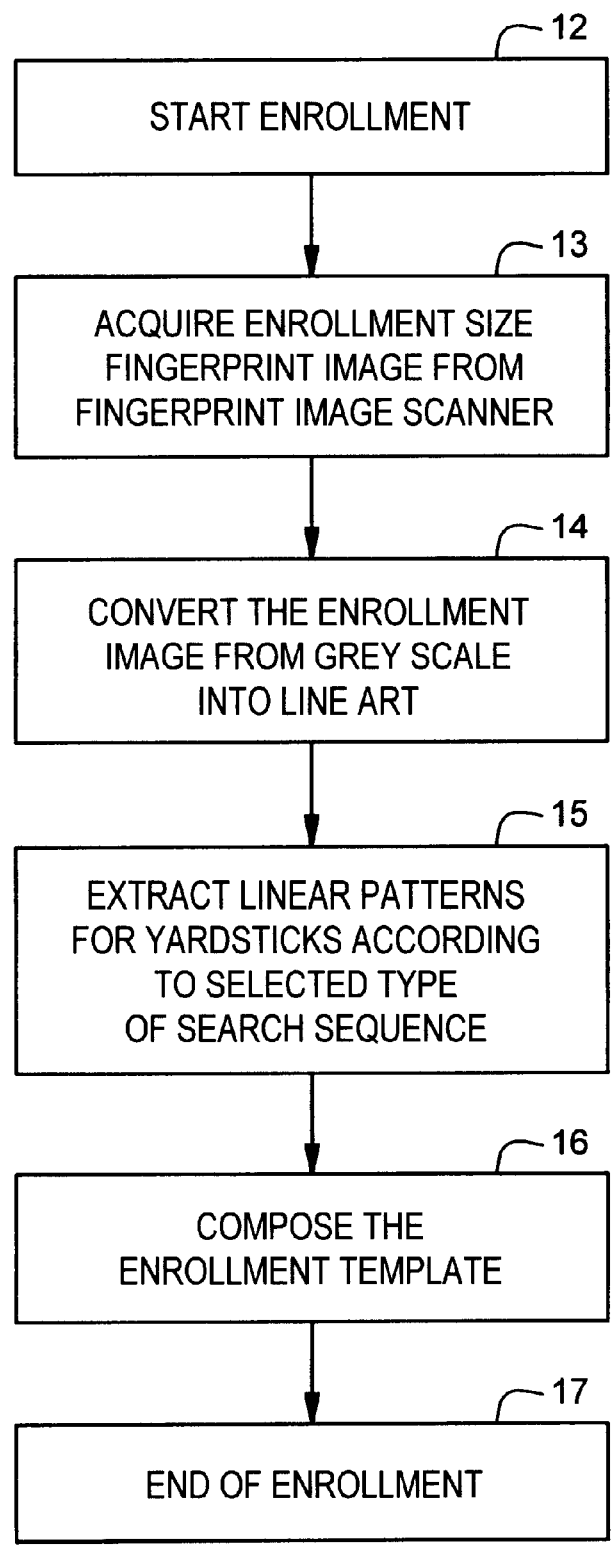
FIG. 8 shows one flowchart of the preferred fingerprint enrollment process, according to the preferred embodiment.

FIG. 8 shows the flowchart of the enrollment process according to the preferred embodiment. After the finger to be enrolled is placed on the fingerprint image scanner 8 and the command start enrollment 12 has been issued by the central processing unit 10, the frame grabber 9 at step 13 acquires from the middle of the acquired frame an image of 96×96 pixels size. At step 14, the image is then converted from grey scale into line art (black and white). Note that this conversion 14 could be done during acquisition phase 13, if the selected video frame grabber 9 is able to do so in real time. Then at step 15 the enrollment image 1 is decomposed into linear patterns called yardsticks, and in a sequence defined by the search algorithm as shown on FIG. 2. Note that depending on the requirements toward the false acceptance and false rejection coefficients it could happen that not all linear pattern could be saved as yardsticks. In this case the maximum possible number of yardsticks will be 192 (96 in each of the two columns), but it is possible that only 96 (only from odd numbered lines) would be enough. This makes this algorithm exceptionally flexible and economical. On the base of created yardsticks, a template for the enrolled finger is created at step 16 with structure described on FIG. 6, stored in memory 11 and this ends the enrollment process at 17. Thus, as explained herein, data from a finger is acquired, processed, and stored, in the preferred embodiment.

Figure 3A:
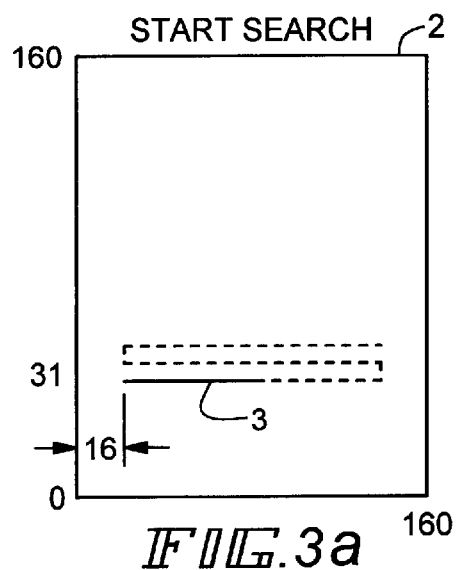
FIGS. 3a, 3b, and 3c represent various stages of the "sliding yardstick" verification process of the present invention.

FIGS. 3a,b,c help to illustrate the verification process of the sliding yardstick fingerprint enrollment and verification algorithm. An image of a fingerprint is acquired and sought to be verified as corresponding to a stored (enrolled) fingerprint.

The acquired image to be verified is always symmnetrically larger than the window used for enrollment. As it could be seen from FIG. 1, in this case the image in the verification window 2 is of size 160×160 pixels, while the enrollment window 1 has a 96×96 pixels size. This is necessary to accommodate offsets and skews between the two images.

The algorithm begins with a search for match for the start yardstick (the first yardstick) 3 inside the image to be verified 2. First yardstick 3 is compared in this case first with an equal number of pixels, in this case forty eight pixels on line 31 of the image to be verified, starting from pixel 24 (FIG. 3a). If no match is found, the first yardstick 3 is shifted a pixel to the right and compared with next forty eight pixels, starting from pixel 25 respectively. This shift comparison is performed until the end of the line (pixel 96 in this case). Then the first (start) yardstick 3 moves to the next line, line 32 in this case, and process repeats itself. In fact how close to the ends of the line the yardstick is to be moved depends on requirements towards the acceptable offset of the image 2 to be verified in regard to the image used during enrollment 1.

The process repeats itself until a match is found.

When a match for first yardstick 3 is found, a comparison process for the second yardstick 4 begins. Yardstick 4, however, already has a fixed position in regard to yardstick 3. It is one line over yardstick 3, according to described algorithm and could be shifted a pixel to the left or right of yardstick 3, due to the skew between the image to be verified and the original enrollment image (note that all numbers are for illustration purposes only), or it could be right above yardstick 3. So, second yardstick 4 is compared only with those three positions and the position selected is the one with the best match. This process continues then the sixty-fourth yardstick 6 (as shown on FIG. 3c), situated beside first yardstick 3 is compared. The yardsticks in the right column, i.e. containing the 64th yardstick, do not need to be shifted. If the matching process satisfies certain matching conditions described below, the verification process is considered positive, but if the conditions are not met, the verification has failed.

In order to increase performance, the algorithm will be interrupted if a number of yardsticks have been mismatched, no matter that the start yardstick did match.

In order to make the system more tolerant to image impediments (finger cuts, dirt, etc.), if the first yardstick 3 does not find a match, in the whole image to be verified, in a next cycle, the start yardstick will be assigned to the mirror yardstick, right half of line 31 in this case, and correspondingly other yardsticks will be mirrored, so they will be in this new start yardstick column.

When used for fingerprint verification or a similar application, this algorithm brings the following additional benefits.

1. It will be equally efficient using static fingerprint placement, as well as in scanners employing sliding finger with multiple images.
2. The false acceptance ratio and false rejection ratio requirements directly affect the number of yardstick comparisons and as well the number of yardsticks used. This means that the size of the template and computing power requirements will be affected. Lower false acceptance requirements thus will generate a smaller template and require a lower level of computing power. This allows the system to be tailored to fit any particular requirements.

Figure 3B:
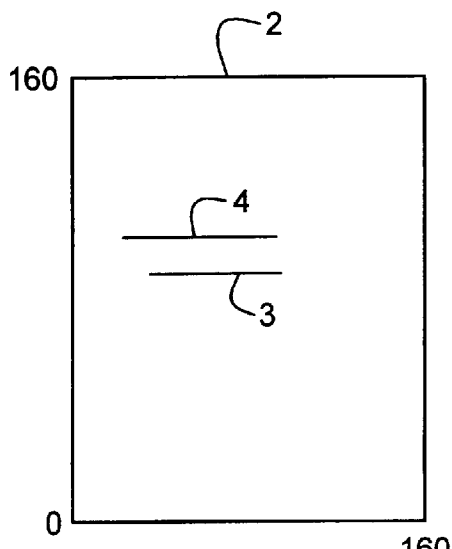
Figure 3C:
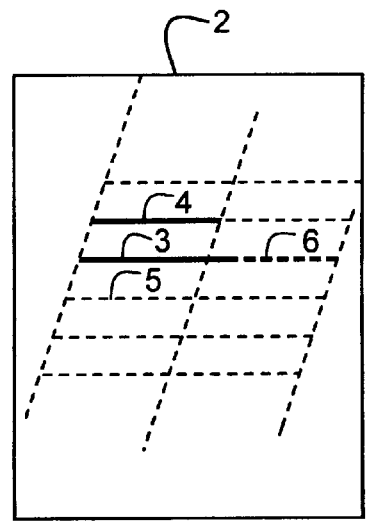

As it is quite obvious from illustrations of FIGS. 3a, 3b, and 3c, the starting yardstick 3 quite effectively compensates for any horizontal and/or vertical offset between the acquired image 2 and the enrollment window 1 within certain constraints limited only by the size of the image 2 to be verified.

Figure 5A:
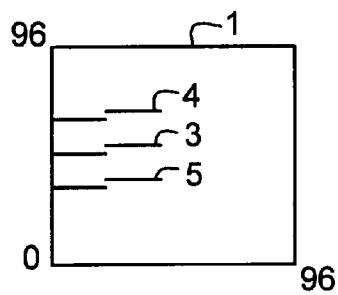
FIG. 5a and FIG. 5b show enrollment windows where each yardstick is composed from parts of two adjacent rows.
Figure 5B:
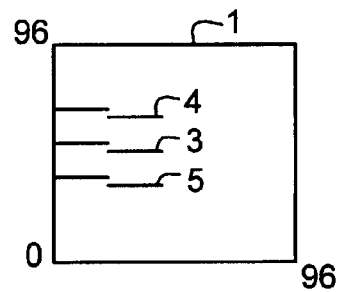

Correspondingly subsequent yardsticks effectively eliminate skews between the image to be verified and the enrollment window. Of course large skews lead to geometrical distortions, so, if very high skew tolerance is needed, it will effectively require either two line yardsticks (see FIG. 5a,b) and triple repetition of the algorithm first with single line yardsticks (FIG. 2) and then consequently with yardsticks on FIG. 5a and 5b. Another solution is to ease the requirements toward false acceptance and false rejection coefficients of the fingerprint verification system.

A most important aspect for ensuring the proper operation of the sliding yardstick algorithm is the use of right method for matching yardsticks to pixel patterns in the image to be verified.

Several fuzzy logic approaches could be implemented, depending the structure of the image to be verified image and the set of yardsticks.

The first case covers line art where the image 2 to be verified has a one bit pixel depth, and so do the yardsticks. In this case a minimum Hamming distance matching is performed.

Figure 4:
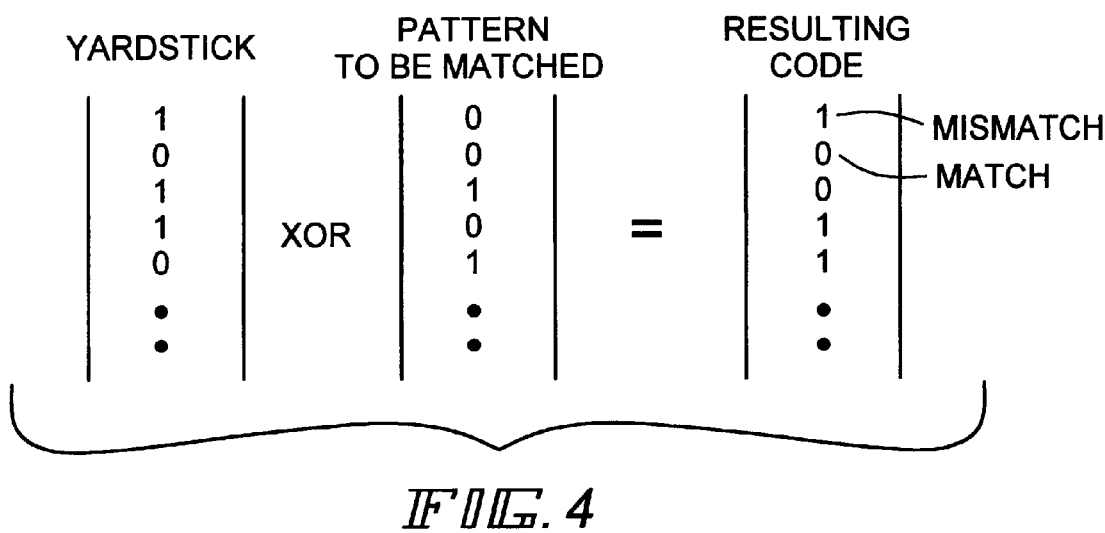
FIG. 4 is an illustration of how to calculate Hamming distance.

FIG. 4 helps to understand how the Hamming distance is calculated. Bits comprising the yardstick are exclusive or-ed with corresponding bits of the pattern from the acquired image to be matched. If bits coincide, i.e. one and one, or zero and zero, the resulting bit will be zero. However if those bits don't coincide, i.e. zero and one, or one and a zero, the resulting bit is one. The number of ones is then counted and divided by the length of the sequence (in this case as far as the length of the sequence is fixed there is no need to divide by it, when used for internal implementations).

If the result is 0, that means both sequences are identical but, if it is 0.5 that means full randomness.

In the sliding yardstick algorithm, the Hamming distance is used the following way. First the distance is calculated, and if it is above a certain threshold (0.15 in this particular application) the first yardstick 3 slides by one pixel in the selected direction in relation to the line from the image 2 currently tested for a match. A new Hamming distance is calculated. If this new Hamming distance is below the threshold, a new shift is performed and a corresponding Hamming distance is calculated. This process is repeated until the Hamming distance starts to increase, which means that a minimum distance was determined. To go back to that minimum distance, then a pixel back shift is performed. After that, the line above and exactly above the same place where the minimum Hamming distance on the current line was calculated is matched (compared) and a Hamming distance lower than a minimum in this direction is sought same way as it was done along a line. This way, best guess matching is performed (for the first yardstick).

For second yardstick 4, however, the following procedure is applied. The minimum Hamming distance is found based on the three positions as described before. After that the average Hamming distance is calculated. This will be equal to the sum of all minimum Hamming distances of previous yardsticks, including the present one, and divided by the number of yardsticks for which minimum Hamming distance has been already calculated. This average Hamming distance is then compared to a threshold, which, preferably, for first predefined number of yardsticks is higher (0.15 in this example) and goes down in stages when number of yardsticks exceeds certain predefined numbers. Thus, the average minimum Hamming distance is calculated for the second through n-th yardstick best match positions and compared to thresholds which are in some inverse relationship to the number of yardsticks.

This kind of organization allows some image defects (poor contact, cuts, dirt, etc.) to be effectively eliminated if they are local or relatively small in size.

At the same time, by controlling threshold values, various false acceptance and false rejection ratios could be achieved depending on the requirements of any particular application.

If the image to be verified 2 is in grey scale, where, for example, each pixel is eight bits deep (any other depth is possible) and the yardstick is of line art type (one bit pixel depth), before the beginning of comparison either the whole image, or more economically the line or part of it which is to be compared with the current yardstick, is converted into line art. This, preferably, is done the following way: all pixels lower than 50% (7f hex in this example) are translated into 0's, and those above 50% into 1's. The comparison then is performed the same way as already described for the line art case. Any other way of transformation of the grey scale image into line art, giving satisfactory results is possible.

When yardsticks and the image to be verified 2 are both grey scale, they are either first translated into line art or the comparison could be done the following way: first each pixel from the current yardstick is subtracted from the corresponding pixel in the verified image; the absolute value from the difference is then compared to a predetermined threshold, and if it is above this threshold it is assigned a one, but if it is below it is assigned a zero. As previously described, one's are mismatches and zero's matches, so, the Hamming distance could be calculated, and the rest of the algorithm would follow the rules already described.

The sliding yardstick algorithm is equally applicable to static finger placement and dynamic finger sliding in the same way. In real time a frame with the finger image is acquired, and the verification process is performed. If verification is successful, the algorithm ends, but if it is unsuccessful, then another frame of the fingerprint image is acquired and sought to be verified. This continues until either a successful verification occurs or rejection occurs due to a preset timeout. This multiple frames verification process allows poor images due to poor contact or placement of the finger to be minimized.

Figure 9:
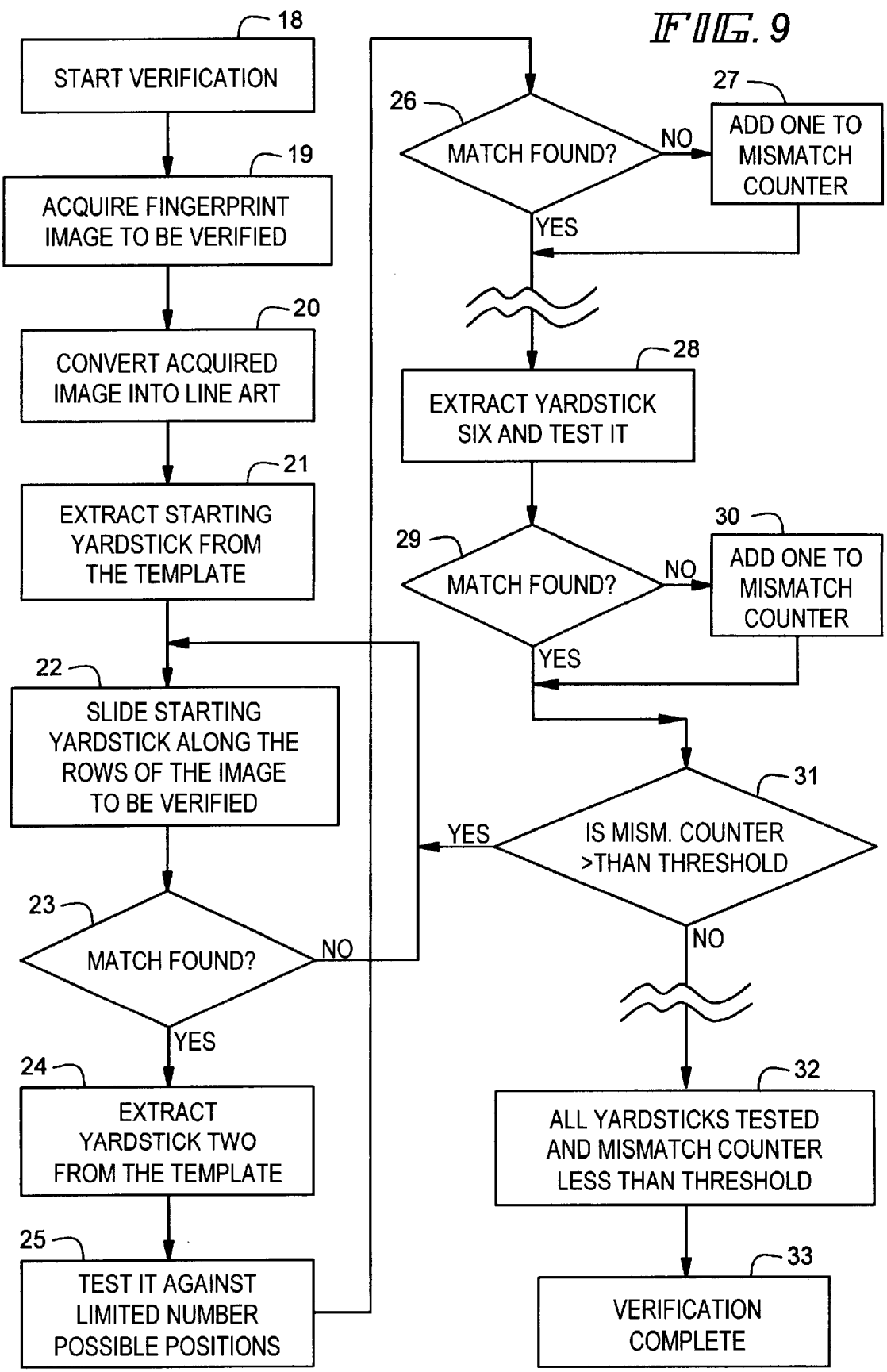
FIG. 9 shows the flowchart of the fingerprint verification process according to the preferred embodiment.

The flowchart shown on FIG. 9 helps to explain how the fingerprint verification process is performed by the sliding yardstick fingerprint enrollment and verification system, according to the preferred embodiment.

After a start verification command 18 has been issued by the central processing unit 10 at step 19, video frame grabber 9 acquires the image to be verified 2. In the next step 20, image is converted from grey scale into a line art image.

At step 21, the starting (first) yardstick 3 is then extracted from the verification template, and the process of sliding it and matching it along the rows of the image to be verified begins at step at step 22. This process was described above. If a match is found, the second yardstick 4 is extracted from the template at step 24 and tested at step 25 against limited possible positions for a match. If a match is not found, a logic one is added to a mismatch counter at step 27. But if a match is found, the mismatch counter is not modified and next (third) yardstick 5 is extracted from the template and tested for a match in a limited number of possible positions in regard to first yardstick 3. This repeats itself with the subsequent yardsticks up to the sixth yardstick (in this example). After a comparison for this yardstick has been completed at step 29, the value inside the mismatch counter is tested at step 31. If it is greater, than a predetermined value, which has been selected to be two in this implementation of step 31, the match of the first yardstick 3 is considered false, and everything starts from block 22 of the flowchart on FIG. 9. For next matches, the threshold of the mismatch counter is correspondingly increased. The verification process is considered successful, when the last yardstick has been matched and the mismatch counter is below the final threshold value, at step 32. The central processing unit 10 ends the image verification algorithm at step 33.

This flowchart, because of limitations of space, does not show what happens if the (first) yardstick 3 does not find a match. In this case, the process returns to step 19 where the frame grabber 9 acquires a new image to be verified and the algorithm repeats itself, until either successful verification occurs, or the system times out. It is obvious that by varying the values of thresholds used for the Hamming distance matching, and those used for the mismatch counter, various requirements toward the false acceptance and false rejection coefficients values could easily be met.

It will be appreciated that the embodiment described above uses a novel process to enroll a fingerprint image (image data) and uses a novel process for subsequently comparing another fingerprint image for verification. The enrollment process extracts yardsticks which may comprise half-lines, whole lines, or columns. The yardsticks are preferably of uniform size, and each yardstick contains black-white data (in the preferred embodiment) for the image to be enrolled. Thus each yardstick may comprise a set of pixels taken from a line or column or portion thereof. Each yardstick represents a set of preferably co-linear pixels, sometimes referred to as a linear "pattern." It will be appreciated that a linear "pattern" can be taken horizontally or vertically. As used herein, linear "pattern" does not refer to minutiae or feature data, but instead to a set of (usually) successive confiner pixels. Thus, the present invention does not need to locate minutiae or known types of features in the enrollment image, but instead obtains sets of pixels from the enrollment image, regardless of what image they define and without regard to whether they define any known minutia or feature. Preferably the enrollment process stores data as a data structure, called a template, in a suitable format.

When comparing an image (image data) to be verified against an enrolled image or enrolled fingerprint data, in a simple case (for line art), a first yardstick from the template is compared with the acquired image (which preferably is larger than the enrollment window). In the preferred algorithm, the first (stored) yardstick is sought to be matched anywhere within a given line of the acquired image, and the yardstick is compared (i.e., its pixels are compared) on a pixel-by-pixel basis to a set of successive pixels of the image to be verified corresponding in length to the length of the yardstick. Absent finding a match at a first location in the image to be verified, the yardstick is shifted along the line and tested, and then shifted and tested again and again, and, if necessary, will shift to another line, seeking a match along that row. (It will be understood that column-wise yardsticks and comparisons are contemplated.) Assuming an acceptable match results for the first yardstick, the second yardstick is next compared to the image to be verified, and can be shifted left or right, or not at all, depending on skew. The best match is chosen, and the process continues until all yardsticks of a first part, e.g. a left side of the image, are matched. Then further remaining yardsticks are sought to be matched with the image to be verified. If the quality of the best match is within tolerance, verification is positive. Not all of the yardsticks need to be used, and in one embodiment, only six yardsticks are processed. Several modifications are described for the yardstick handling and for determining match criteria. If no match is found for the first selected yardstick, then another first yardstick can be selected. This technique is applied also to grey scale data.

A Segmented Yardstick Embodiment

A modified error tolerant segmented yardstick based verification system and method is illustrated in FIGS. 10 to 15 and will now be described.

Figure 10:
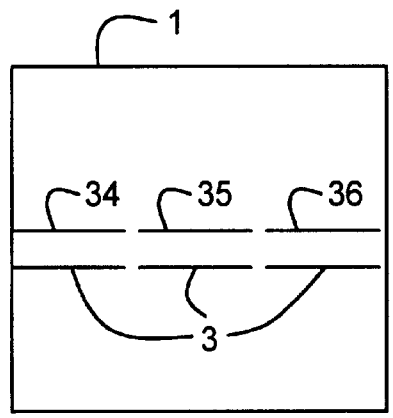
FIG. 10 shows a segmented first yardstick one-in the enrollment window.

The yardsticks in this system have been divided into segments. FIG. 10 shows first yardstick 3, comprised by three segments in this particular example. Those segments have predetermined places within any given yardstick and further in this description they will be called for convenience as follows: a first segment 34 is the left segment, a second segment 35 is the middle segment, and a third segment 36 is the right segment. This segmentation of the yardsticks has several advantages.

- it allows the algorithm to fit more closely the internal structure of either the DSP processor or the microcontroller on which the algorithm is implemented.
- There is much more flexibility in the yardstick matching process, because it could allow one of the segments to fail and still obtain a positive match.

Figure 13:
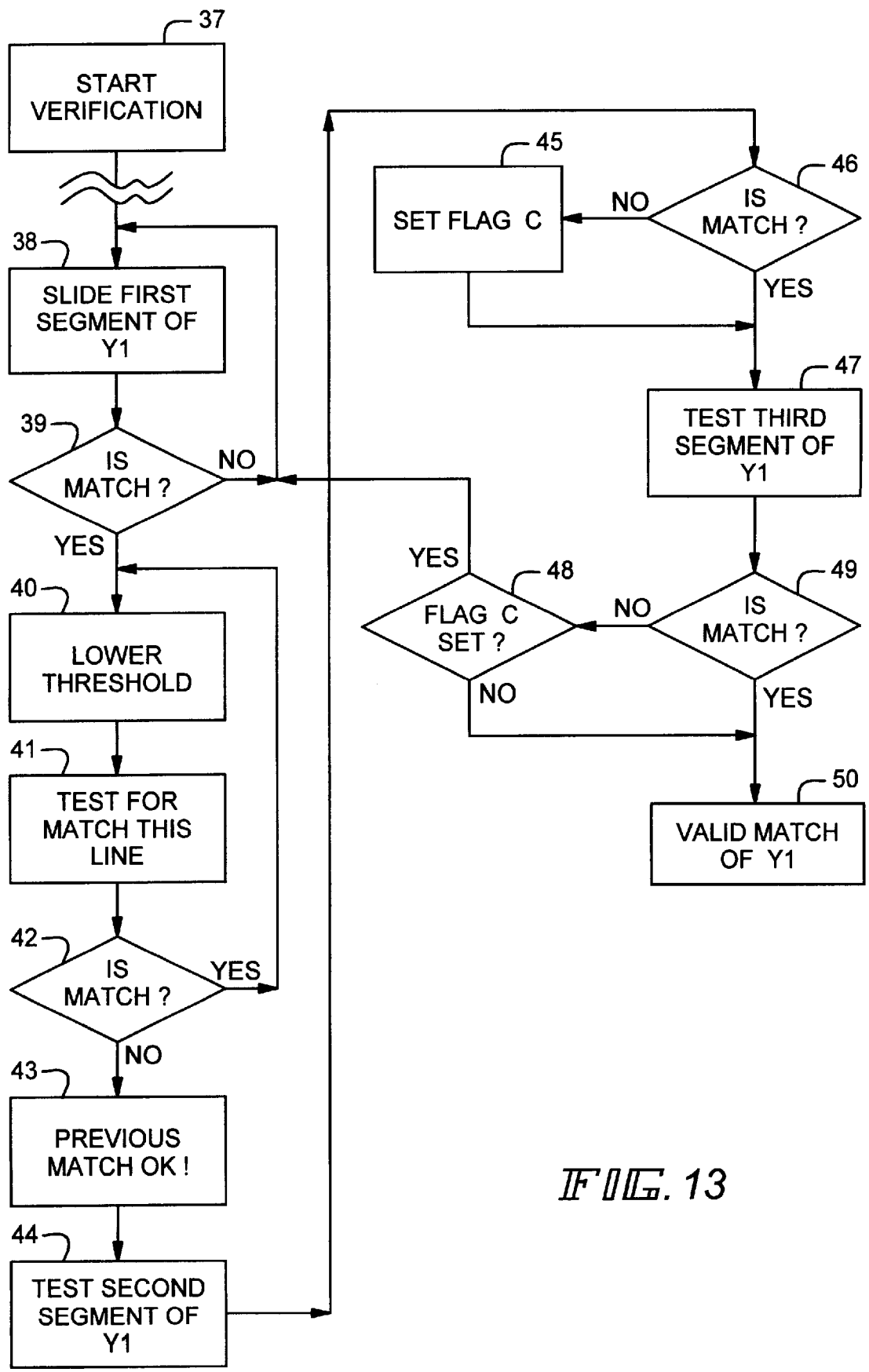
FIG. 13 is a flowchart to explain the verification process for a segmented first yardstick.
Figure 14:
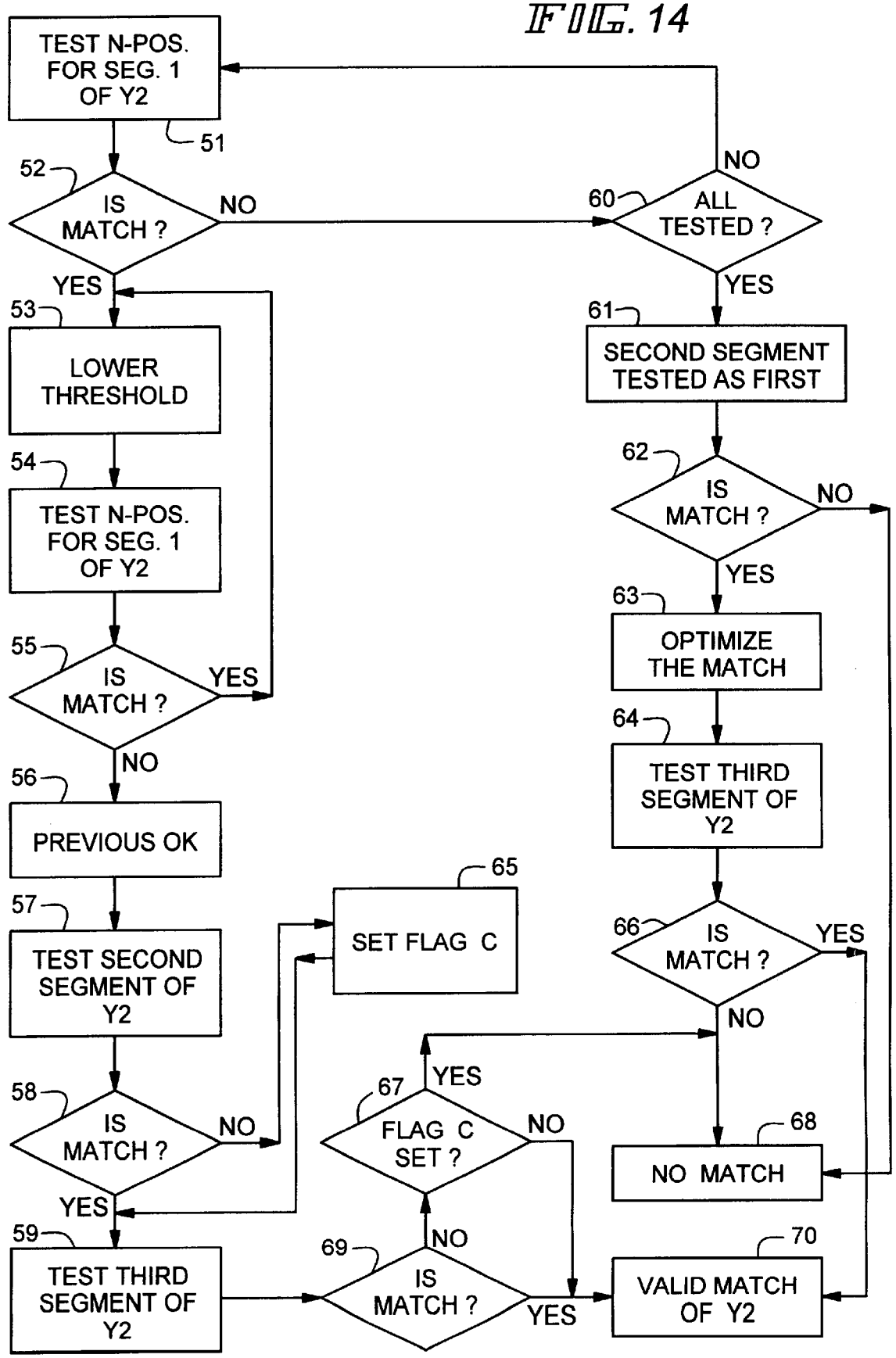
FIG. 14 illustrates the process of verification for a segmented second yardstick and is actually common for all other yardsticks.
Figure 15:
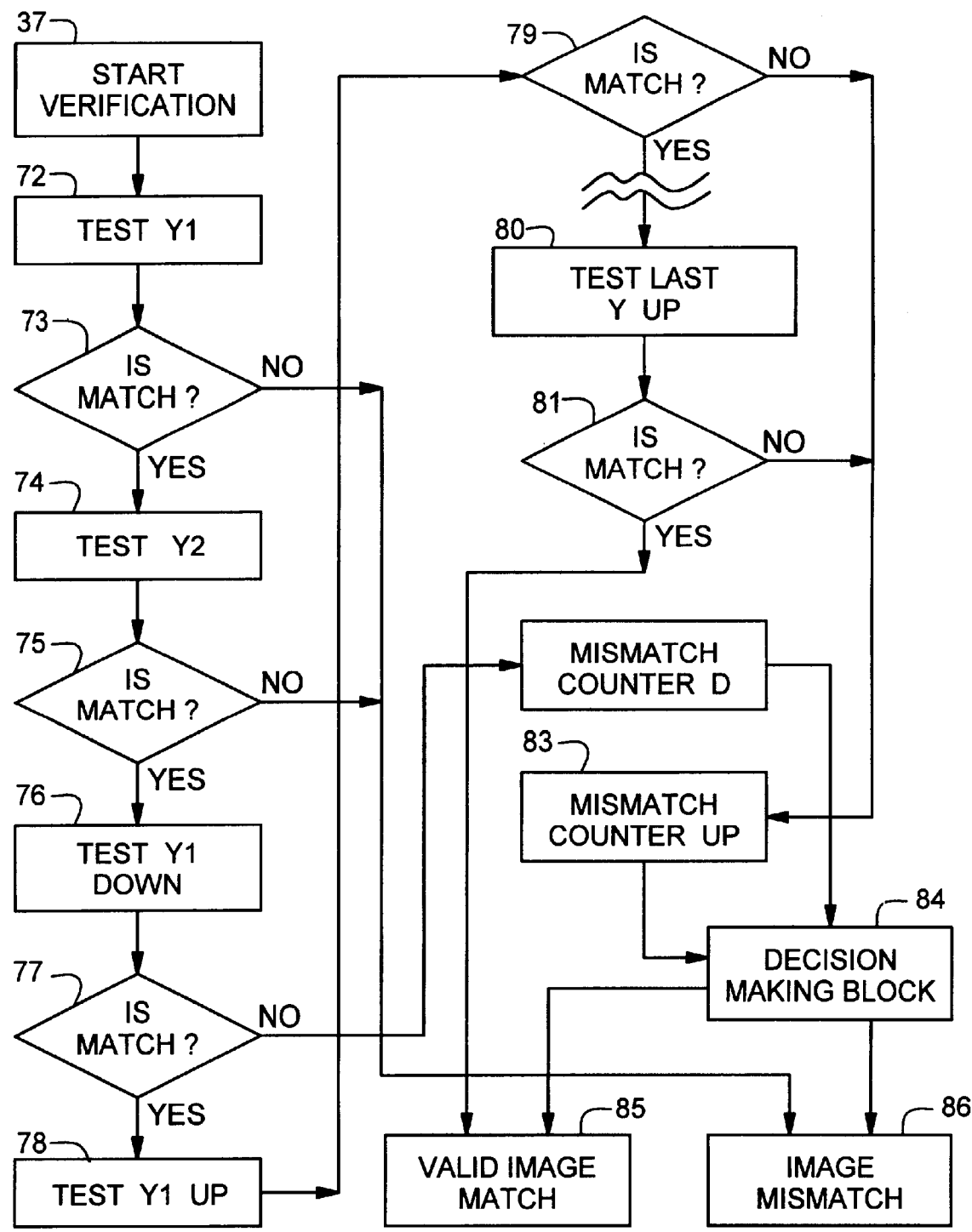
FIG. 15 is a flowchart describing the whole verification process.

The process of matching first yardstick 3 is illustrated by the flowchart on FIG. 13. In FIGS. 13 to 15, the symbol "Y1" means "first yardstick." The symbol Y2 means the second yardstick, and so on.

Here, instead of starting with the whole yardstick 3, the matching process starts with one of the segments thereof, in this example, first segment 34 of first yardstick 3. At block 38, the first segment is shifted along the lines of the verification image 2, and at diamond 39 it is tested for matching. The matching process 39 is identical to that used for the whole yardstick, preferably calculating the Hamming distance as described earlier. When a match is found, an optimization procedure is applied. Note that this same procedure could be applied also in the whole yardstick algorithm embodiment.

Figure 11:
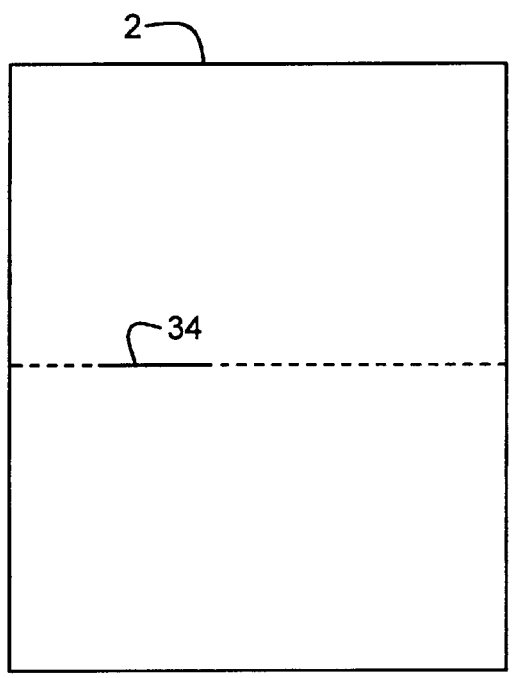
FIG. 11 illustrates the sliding of the first segment of the first yardstick along a line in the verification window.

The optimization procedure has the following steps:

- The acceptance threshold is made tighter (lower) at block 40.
- At block 41, the line of the verification image 2, where a match was detected, is tested again for a match by shifting first segment 34 of yardstick 3 along this line, as illustrated also on FIG. 11. A line of the verification image that is currently being tested against a yardstick or segment thereof may be called the "current line."

At diamond 42, if a match is found, the process is repeated, so that the threshold is further tightened at block 40, line tested for a match at 41, until no match is detected at diamond 42.

At block 43, the address of the last successful match is considered the address of the match of the first segment 34 of the first yardstick 3 and is used as a positional reference for testing the next segments.

After the match for first segment 34 of yardstick 3 has been successfully found, the process advances to block 44. There, the second segment 35 of yardstick 3 is tested for a match 44, right from the right end of segment 34 of yardstick 3 in our example. If there is no match determined by decision diamond 46, a special flag C is set at block 45 and the process moves towards matching the third segment 36 of yardstick 3. If there is a match for second segment 35 of yardstick 3, the flag C at block 45 is cleared. At block 47, the matching of third segment 36 of first yardstick 3 is performed from the right end of second segment 35 of first yardstick 3. If a match is found at diamond 49 for third segment 36 of first yardstick 3, the process for matching of first yardstick 3 is successful and a valid match for first yardstick 3 is registered at block 50. If, however, there is no match for third segment 36 of the first yardstick 3, flag C is tested at diamond 48. In case that flag C is (still) set, an invalid match is registered, and the process of looking for a match for first segment 34 of first yardstick 3 proceeds further from the point at which the unsuccessful match was found.

It is important to note that on the flowchart of FIG. 13, in order to simplify the explanation, first yardstick 3 is divided into three segments, and a match is considered valid if two of the three segments are matched successfully.

As a variation, each yardstick could be divided into a larger number of segments, and further instead of tolerating one segment failure (out of three), more segments could be allowed to fail and still the match would be considered successful.

In another variation, the sequential order of matching the segments could be different, or could be rotated, in which case eventual defects in the segment considered the "first" segment 34 (the successful matching of which at diamond 39 starts the whole process and should be always successful) would not impede the whole verification process.

Figure 12:
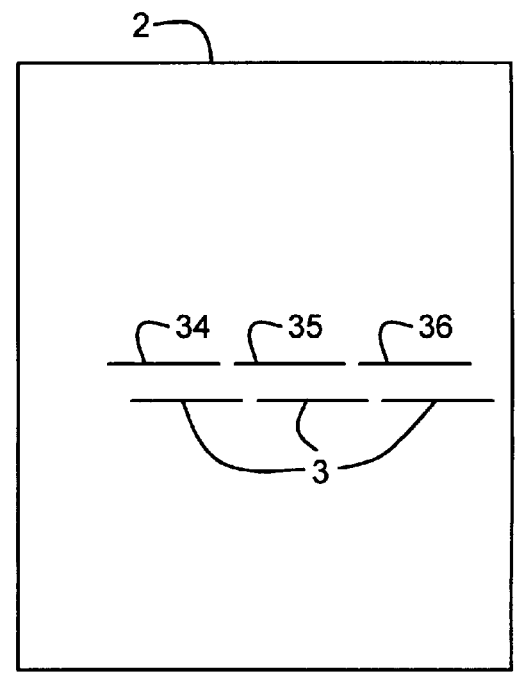
FIG. 12 shows a first yardstick one with all of its segments and a second yardstick segments above it within the verification window.

FIG. 14 illustrates the process of matching the segments comprising the second yardstick 4 in the verification window 2. FIG. 12, showing the three segments 34, 35 and 36 of the second yardstick in a positional relationship to first yardstick 3, inside the verification window 2, will be helpful too in this explanation.

The flowchart of FIG. 14 follows a successful match for first yardstick 3. Once again, in FIG. 14, the second yardstick is denoted "Y2".

In this part of the verification process, the first segment 34 of second yardstick 4 is tested for matching, but any other order is possible. (It will be understood that reference number 34 means a first segment of any given yardstick, not just the first yardstick.)

The matching test for segment 34 of the second yardstick is performed at block 51 for a limited number of positions surrounding the position corresponding the position of this segment in regard to the first yardstick 3 within enrollment window 1. Those positions depend on the requirements towards the system tolerance to geometrical distortions and impediments due to skew, compression, extension, etc.

If a match is found at decision diamond 52, position optimization process is performed, similar to the one done for the first segment 34 of yardstick 3. The matching threshold is lowered by a fraction at block 53, and n-positions for segment 34 of second yardstick 4 are tested for a match at block 54 and diamond 55, until no match is found. The position of last successful match, is the position of segment 34 of second yardstick 4, as shown at block 56.

Similar to the process for matching the first yardstick 3, the second segment 35 of second yardstick 4 is tested at block 57 at a fixed position on the right side of segment 34 of second yardstick 4. If there is no match found at diamond 58, a special flag C is set at block 65, and then the third segment 36 of second yardstick 4 is tested for a match at block 59, exactly on the right side of segment 35 of second yardstick 4. Again, if no match is detected at diamond 69, then flag C is tested at diamond 67. If it has been set, no match is indicated at block 68, but if flag C is clear, then a valid match for second yardstick 4 is registered at block 70.

If the first segment 34 of the second yardstick 4 goes through all n-positions, as decided at diamond 60, and no match is found then the process moves to block 61. There, the second segment 35 of yardstick 4 were tested as if it is the first segment 34 for all positions surrounding its position relative to the second segment 35 of first yardstick 3 in enrollment window 1.

If there is no match found at diamond 62, a mismatch for the second yardstick 4 is registered at diamond 68. If, however there is a match at diamond 62, the optimization procedure 63, identical to that one described for the first segment 34 of the second yardstick 4 (see blocks 53,54,55 and 56 in the flowchart), is performed for defining the exact position of the second segment 35 of second yardstick 4, then the third segment 36 of yardstick 4 is tested for a match at block 64. If a match is found at diamond this third segment 36, a valid match for yardstick 4 is registered at block 70, else a no match is registered at block 68.

This flowchart shown on FIG. 14 describes the verification process for second yardstick 4, but it will be practically identical for any other yardstick with the exception of first yardstick 3.

By way of variation, the sequential order of segments could be different, or the order could be rotated, to increase the reliability of the verification process.

Thus, it will be understood that the method of FIG. 14 provides for optimization in matching all the yardsticks, after the first yardstick, that are sought to be matched.

The flowchart on FIG. 15 briefly illustrates the verification process for a template having n-yardsticks. It could be applied to both described verification embodiments.

After the start of the verification process at block 37, the first yardstick 3 is tested at block 72 for a match, according to the already described algorithm from FIG. 13. If there is no match found at diamond 73, the verification process is found unsuccessful at block 86, a new verification image is acquired, and the verification process for this image started again.

If first yardstick 3 finds a valid match at diamond 73, second yardstick 4 is tested at block 74, and again if no match is found at diamond 75, the verification result is negative at block 86, and process repeats with the acquisition of a new verification image.

If, however, the second yardstick finds a match at diamond 75, a next yardstick, which in this case is the yardstick below the first yardstick 3, and for simplicity is called first yardstick down, is tested at block 76. If decision diamond 77 shows no match, then at block 82, a mismatch counter down is incremented. At block 78, the first yardstick up, the one above the second yardstick 4, is tested for a match at block 78. If the match is unsuccessful (diamond 79) the contents of a mismatch counter up is incremented at block 83. If the matches are valid, the contents of counter up, 83 and respectively counter down 82 is not modified.

This process proceeds either until the last yardstick, in this case the last yardstick up is tested at block 80, or the process will be interrupted by the decision making block 84 under certain conditions described below.

One example of the function of the decision making block 84 is as follows. Block 84 checks the contents of the mismatch counter down 82, and mismatch counter up 83 and compares them to predetermined thresholds.

The purpose of the decision making process is to keep the verification process tolerant to various image impediments, and at the same time to keep the false acceptance and rejection ratios below predefined values.

The decision making block 84 detects, for example, when the number of failed yardsticks up is above a preselected threshold value. This threshold value is either increased or ignored during the matching of next yardsticks up. However, the threshold value for the yardsticks down is either decreased or kept constant. The same will happen when the mismatch counter down 82 exceeds its threshold. The selection of the threshold values and their variation depends on the current requirements towards false acceptance and rejection coefficients for the particular verification system.

If both values, that of the mismatch counter up 83 and that of the mismatch counter down, exceed their respective thresholds, an image mismatch is detected at block 86.

In the flowchart shown on FIG. 15, first yardstick 3 and second yardstick 4 do not affect the contents of the mismatch counters, and if either fails, the verification process ends up as image mismatch. This condition could be extended to a larger number of yardsticks if a better false acceptance ratio is necessary.

The embodiment shown in FIG. 9 does not show the use of segmented yardsticks. With regard to tolerance, a first yardstick must be matched and then second through sixth yardsticks are sought to be matched, but for each of the second through sixth yardsticks that cannot be matched, a mismatch count is incremented. The decision is made on the value of the mismatch count relative to a threshold (tolerance). There is further tolerance in the decision diamonds which determine whether a "match" is found so that zero need not be the threshold used for the Hamming distance matching. (A distance of zero means the sequences are identical).

The embodiment of FIG. 13 shows one way to match a first segmented yardstick. One tolerance that is expressly provided for concerns the flag C which permits one or more of the segments not to match and yet permits the entire yardstick to be found to match the image to be verified. FIG. 13 does not show any mismatch counts of the sort shown in FIG. 9 which permit multiple yardsticks to be unmatched. However, FIG. 15 shows a verification process where a first yardstick (Y1) is tested using segments. After matching a first yardstick (and in that illustrated embodiment a second one also), yardsticks below and above the first yardstick are tested (using segments), and if they fail to match, one or more mismatch counts are incremented. This contemplates at least two different tolerances, quite apart from the original tolerance in determining whether there is a statistical match in any comparison of data The first additional tolerance is in permitting some segments of any selected yardstick not to match, while still declaring the yardstick a match. The second additional tolerance is in permitting entire yardsticks not to match, provided that a mismatch count does not exceed a predetermined and preferably adjustable tolerance.

The foregoing embodiments use a comparison to determine a statistical similarity. The preferred statistical similarity is calculated as the Hamming distance, but as mentioned above, other approaches could be used.

While the above-described embodiments of the inventions are the preferred ones, it is apparent for those skilled in the art that many other changes and modifications may be made without departing from the invention in its broader aspects. Therefore, the intention of the claims is to cover such changes and modifications falling within the true spirit and scope of the invention.

The embodiments of the invention in which an exclusive property or privilege is claimed are defined as follows:

1. A biometric enrollment and verification method comprising the steps of: obtaining biometric image signals for an image to be verified; obtaining a data structure for an enrolled image, said data structure having a plurality of yardsticks in a predetermined order, each said yardstick comprising a one dimensional pixel array having a predetermined number of either horizontal or vertically oriented, consecutive, co-linear pixels corresponding to a predetermined portion of a row or column of pixels within said enrollment image, each yardstick having a predetermined spatial relationship within said enrollment image relative to each of said other yardsticks, the maximum number of said yardsticks being substantially smaller than the maximum number extractable from the enrollment image and organized into a plurality of adjacent segments, comparing said yardsticks to an image to be verified by comparing segments of each yardstick to corresponding linear patterns in the image to be verified, wherein the result of the comparison of segments in a particular yardstick determines if said yardstick has found a match.

2. A biometric image verification method according to claim 1 wherein even if a predetermined number of segments fail to match corresponding linear patterns in the image to be verified, the result of matching the yardstick which includes said segments will be positive if other segments from said yardstick do match.

3. A biometric image verification method according to claim 1:

wherein the first segment of the first yardstick is compared for a match to a line pattern of the same size inside the image to be verified, wherein if there is no match the first segment of the first yardstick shifts relative to the linear pattern from the image to be verified and again is tested for a match, wherein if the current line has been tested and no match found, the segment moves to the next line, and the process repeats until a match is found, then the second segment of the first yardstick is compared to a line pattern from the image to be verified corresponding to its position relative to the first segment of the first yardstick for a match, and continuing until the last segment from the first yardstick has been matched.

4. A biometric image verification method as claimed in claim 3, wherein if a predetermined number of segments from the first yardstick fail to match corresponding line patterns from the image to be verified, further matching of the remaining segments of the first yardstick is discontinued and the match considered unsuccessful.

5. A biometric verification system as claimed in claim 3, wherein the central processor unit is programmed so that if it fails to find a match for the first yardstick in the acquired image to be verified, the next image to be verified is acquired, stored into memory and the first yardstick starts tests for a match from the same position it started the said tests with the previous image sought to be verified.

6. A biometric image verification method according to claim 1 wherein if a segment finds a match, the threshold for matching is made more stringent, new testing for a match is performed, and this process is repeated until no match is detected, and wherein the position of the last successful match in the image to be verified is the position of the match for said segment.

7. A biometric image verification method according to claim 1 wherein the test for matching the yardsticks to linear patterns of the same size from the image to be verified is performed by calculating the Hamming distance between them and comparing it to a predetermined threshold.

8. A biometric image verification method according to claim 1 wherein step of said obtaining and storing biometric image signals for the image to be verified includes:
converting the image to be verified into a line art image with one bit pixel depth, and
saving said line art image into memory for verification purposes.

9. A biometric verification method according to claim 1:
wherein the first segment of any selected yardstick from said data structure, except for the first yardstick, is compared for a match to line patterns of the same size inside the image to be verified, for a limited number of positions surrounding and including the position corresponding to the position of this segment of said selected yardstick in regard to the positions of the yardsticks tested for a match prior to said selected yardstick within the current verification process,
and if there is a match, the second segment of said selected yardstick is tested for a match at a fixed position corresponding to its relative position to the first segment of said selected yardstick,
then the next segment is tested for a match, the same way as the second segment, and this process repeats, until the last segment of said selected yardstick has been tested for a match;
if no successful match is found for the first segment of said selected yardstick, the next segment is then tested for a match, for a limited number of positions surrounding and including the position corresponding to the position of said next segment of said selected yardstick in regard to the positions of the yardsticks tested for a match prior to selected yardstick within the current verification process.

10. A biometric verification method as claimed in claim 9, wherein if a match is found for a segment, the threshold for matching is made more stringent, new testing for a match is performed, and this process is repeated until no match is detected, and wherein the position of the last successful match in the image to be verified is the position of the match for said segment.

11. A biometric verification method as claimed in claim 9, wherein the number of said next segments to be tested as said first segment, after the test for a match of the previous segment failed, is limited to a predetermined number of segments from said given yardstick.

12. A biometric verification method as claimed in claim 9, wherein if all segments of a yardstick tested for a match as said first segment fail to find a successful match, the test for a match of said yardstick to the line pattern in the verification image is not successful, even if the preset threshold for the number of failed segments has not been exceeded.

13. A biometric verification method as claimed in claim 9, wherein if a predetermined number of segments from said given yardstick fail to match corresponding line patterns from the image to be verified, further matching of the remaining segments of the given yardstick is discontinued and the match considered unsuccessful.

14. A biometric verification method as claimed in claim 1, wherein said comparing step includes deciding whether said data structure has found a match inside said image to be verified is made by a decision making step.

15. A biometric verification method as claimed in claim 14, wherein the matching process is considered successful by said decision making step if each of a predetermined number of yardsticks from the data structure finds a successful match.

16. A biometric verification method as claimed in claim 14, wherein the verification process is considered unsuccessful by said decision making step if any one of predetermined ones of said yardsticks is not found to match said fingerprint image to be verified.

17. A biometric verification system as claimed in claim 14, wherein the decision making step compares mismatch counts to corresponding threshold values.

18. A biometric verification method as claimed in claim 17, wherein if the contents of one of said mismatch counts exceeds its threshold value, said threshold value is modified.

19. A biometric verification method as claimed in claim 18, wherein said decision making step modifies the threshold values for other mismatch counters.

20. A biometric verification method as claimed in claim 19, including relaxing the threshold value for said one mismatch counter, and making the threshold values for said other mismatch counters more stringent.

21. A biometric verification method as claimed in claim 17, wherein if a predetermined number of mismatch counts exceed their corresponding threshold values the current verification process is considered unsuccessful.

22. The method of claim 1 wherein said image to be verified can be verified even if a yardstick from the enrolled image fails to find a match.

23. The method of claim 22 wherein said image to be verified is not verified if a predetermined number of yardsticks sought to be matched cannot be matched.

24. The verification method of claim 1 wherein said step of obtaining a data structure for an enrolled biometric image includes deriving a plurality of yardsticks from data representing an image to be enrolled, each said yardstick being based on pixel data from co-linear pixels of said image.

25. The method of claim 1 wherein said comparing step includes first and second tolerances;
wherein said first tolerance permits one of said yardsticks to be found to correspond sufficiently to acquired data for the image to be verified even if the verification process has not been able to match a first limited number of segments of said yardstick to said acquired data;
wherein said second tolerance permits said image to be verified to be found to correspond sufficiently to an enrolled image even if the verification process has not been able to match a second limited number of said yardsticks to said acquired data.

26. The method of claim 25 wherein said comparing step includes applying said first tolerance applies for each of said yardsticks sought to be matched.

27. The method of claim 25 wherein said comparing step includes applying said second tolerance to a plurality of said yardsticks.

28. The method of claim 25 wherein said comparing step includes applying said first tolerance but not said second tolerance to at least one of said yardsticks.

29. The method of claim 25 wherein said comparing step compares said yardsticks in a predetermined order.

30. The method of claim 1 wherein said comparing step, after finding a first match for a said yardstick, compares all other ones of said yardsticks which are sought to be matched to limited numbers of locations within the data for the image to be verified.

31. The method of claim 1 wherein said comparing step further includes a match optimization step to at least one yardstick segment.

32. The method of claim 1 wherein said comparing step requires a sufficient match, within a first tolerance, of at least one of said yardsticks;
   wherein after said first sufficient match has been found, a plurality of further matches is sought in said comparing step;
   wherein each said further matches is sought at limited numbers of respective locations relative to a location where a prior match had been determined; and
   wherein a second tolerance is applied in the comparing step for at least one of said further matches.

33. The method of claim 32 wherein said second tolerance includes maintaining a mismatch count; and incrementing said mismatch count if said comparing step does not find a match for selected ones of said yardsticks in the image data to be verified.

34. The method of claim 33 wherein said comparing step includes adjusting said second tolerance.

35. The method of claim 33 wherein said comparing step includes a decision making step and wherein said adjusting occurs in said decision making step.

36. The method of claim 1 wherein said comparing step includes maintaining first and second mismatch counts; and incrementing a selected one of said mismatch counts for each of selected ones of said yardsticks if said comparing step does not find a match therefor in the image data to be verified.

37. An enrollment system for biometric identification device, having
   an input device to provide signals representing an enrollment image,
   a memory, and
   a control system coupled to said memory,
   wherein said control system includes a processing unit to extract yardsticks from said enrollment image, each said yardstick comprising a one dimensional pixel array having a predetermined number of either horizontal or vertically oriented, consecutive, co-linear pixels corresponding to a predetermined portion of a row or column of pixels within said enrollment image, each yardstick having a predetermined spatial relationship within said enrollment image relative to each of said other yardsticks, the maximum number of said yardsticks being substantially smaller than the maximum number extractable from the enrollment image and each yardstick being divided into a predetermined number of adjacent, multiple pixel segments, and
   wherein said control system causes said yardsticks to be stored in said memory.

38. An enrollment system for biometric identification device as claimed in claim 37, wherein the acquired enrollment image is converted into line art image with one bit pixel depth and saved into memory for further processing.

39. The enrollment system of claim 1 wherein said central processor is arranged to store said yardsticks in a predetermined data structure.

40. A biometric enrollment and verification system, comprising:
   an input device to acquire biometric images,
   a memory to store the acquired images from said input device,
   a central processor unit to control and synchronize the operation of said biometric enrollment and verification system, and
   a data structure including a plurality of yardsticks in a predetermined order, each said yardstick comprising a one dimensional pixel array having a predetermined number of either horizontal or vertically oriented, consecutive, co-linear pixels corresponding to a predetermined portion of a row or column of pixels within said enrollment image, each yardstick having a predetermined spatial relationship within said enrollment image relative to each of said other yardsticks, the maximum number of said yardsticks being substantially smaller than the maximum number extractable from the enrollment image and organized into a plurality of adjacent segments,
   wherein said central processor unit compares said yardsticks for a match to a biometric image to be verified by comparing sequentially segments of each yardstick to corresponding linear patterns in the image to be verified, wherein the result of the comparison of all segments in a particular yardstick determines if said yardstick has found a match.

41. A biometric verification system as claimed in claim 40, wherein yardsticks comprising the enrollment data structure are divided into groups, each group having assigned a corresponding mismatch counter, to count yardsticks in said group, failing to find a match.

42. In a biometric enrollment and verification system stored on a computer-readable medium, comprising the steps of:
   acquiring data representing an image to be verified;
   obtaining a plurality of sets of data each representing a set of co-linear pixels from an enrolled image said set being called yardstick and each said yardstick comprising a one dimensional pixel array having a predetermined number of either horizontal or vertically oriented,
   consecutive, co-linear pixels corresponding to a predetermined portion-of a row or column of pixels within said enrollment image, each yardstick having a predetermined spatial relationship within said enrollment image relative to each of said other yardsticks, the maximum number of said yardsticks being substantially smaller than the maximum number extractable from the enrollment image, each set of data including a plurality of subsets, each subset representing a segment of said yardstick;
   accessing said subsets of data; and
   comparing said subsets with data for said image to be verified, outputting a verification result after comparing.

43. The data structure of claim 42 wherein each said yardstick has uniform length.

44. The data structure of claim 43 wherein each said yardstick is selected from the group consisting of a line of pixels in a row of said enrollment image and a line of pixels in a column of said enrollment image.

45. A biometric image enrollment method comprising the steps of:

provimg an enrollment image representation and obtaining digitized enrollment image data;

obtaining a plurality of sets of pixel data from said enrollment representation called yardsticks, each said yardstick comprising a one dimensional pixel array having a predetermined number of either horizontal or vertically oriented, consecutive, co-linear pixels corresponding to a predetermined portion of a row or column of pixels within said enrollment image, each yardstick having a predetermined spatial relationship within said enrollment image relative to each of said other yardsticks, the maximum number of said yardsticks being substantially smaller than the maximum number extractable from the enrollment image, dividing said sets of pixel data into a plurality of subsets corresponding to adjacent segments of said co-linear pixels; and storing said subsets of pixel data in a memory.

46. The method of claim 45 further including storing said sets of data and subsets thereof in a data structure.

47. A method of biometric enrollment and verification comprising the steps of:

acquiring data representing an image to be verified;

obtaining a plurality of sets of data each representing a set of co-linear pixels from an enrolled image said set being called yardstick and each said yardstick comprising a one dimensional pixel array having a predetermined number of either horizontal or vertically oriented, consecutive, co-linear pixels corresponding to a predetermined portion of a row or column of pixels within said enrollment image, each yardstick having a predetermined spatial relationship within said enrollment image relative to each of said other yardsticks, the maximum number of said yardsticks being substantially smaller than the maximum number extractable from the enrollment image, each set of data including a plurality of subsets, each subset representing a segment of said yardstick;

accessing said subsets of data; and comparing said subsets with data for said image to be verified, outputting a verification result after comparing.

48. The method of claim 47 wherein said comparing step further includes a match optimization step.

49. The method of claim 47 wherein said comparing step requires a sufficient match, within a tolerance, of at least one of said yardsticks;

wherein after a first sufficient match has been found for a said yardstick; a plurality of further matches is sought in said comparing step;

wherein each said further match is sought at only limited numbers of respective locations relative to a location where a prior match had been determined.

50. The method of claim 47 wherein said step of obtaining a plurality of sets of data includes accessing a stored data structure which contains said sets of data in a predetermined order.

51. The method of claim 47 wherein said comparing step, after finding a first match for a said yardstick, compares at least one other one said yardsticks to limited numbers of locations within the data for the image to be verified.

52. A biometric image verification method according to claim 47 wherein said comparing step verifies the acquired data as corresponding to an enrolled image, even if a limited number of said subsets of said enrolled sets of data are not found to be sufficiently matched to said acquired data.

53. The method of claim 47 wherein said accessing and comparing steps comprise:

accessing a first one of said sets of data;

accessing a first subset from said first set;

then comparing said first subset with said data for said image to be verified in a plurality of locations until a match has been found;

then sequentially comparing one or more further subsets from said first set and comparing each said further subset to said data for said image to be verified at locations corresponding to the position of the pixels represented by said further subset relative to the positions of the pixels represented by said first subset, until a sufficient number of subsets have been matched to data for said image to be verified; then accessing one or more further sets of data and comparing the subsets of each at only limited numbers of locations relative to the location at which a match was found for a previously matched set of data; and determining whether the image to be verified corresponds to the enrolled image as a function of the matches located in said sets and subsets of data.

54. The method of claim 53 wherein a set of data is determined to have been matched after a predetermined number of subsets thereof have been found to match the data for said image to be verified.

* * * * *